United States Patent
Nayak et al.

(10) Patent No.: US 6,297,949 B1
(45) Date of Patent: Oct. 2, 2001

(54) RECESSED BEZEL APPARATUS

(75) Inventors: Ashok B. Nayak, Glendora; Walter Fehlmann, Fountain Valley, both of CA (US); Alexander Chan, Colorado Springs, CO (US)

(73) Assignee: Seagate Removable Storage Solutions LLC, Scotts Valley, CA (US)

(*) Notice: Subject to any disclaimer, the term of this patent is extended or adjusted under 35 U.S.C. 154(b) by 0 days.

(21) Appl. No.: 09/060,219

(22) Filed: Apr. 14, 1998

Related U.S. Application Data

(60) Provisional application No. 60/043,619, filed on Apr. 14, 1997.

(51) Int. Cl.[7] ................................................ G06F 1/16
(52) U.S. Cl. ........................ 361/684; 439/152; 361/724
(58) Field of Search .................................. 361/684, 685, 361/724–727; 439/152–160

(56) References Cited

U.S. PATENT DOCUMENTS

| 4,397,511 | * | 8/1983 | Clark et al. ........................ 339/17 |
| 5,710,676 | * | 1/1998 | Fry et al. ........................ 360/72.1 |
| 5,927,386 | * | 7/1999 | Lin ........................................ 361/685 |
| 6,018,456 | * | 1/2000 | Young et al. ........................ 361/684 |
| 6,025,989 | * | 2/2000 | Ayd et al. ............................ 361/695 |
| 6,115,243 | * | 9/2000 | Horii .................................... 361/684 |

* cited by examiner

Primary Examiner—Leo P. Picard
Assistant Examiner—Hung Van Duong
(74) Attorney, Agent, or Firm—McDermott, Will & Emery

(57) ABSTRACT

A recessed bezel and corresponding assembly are provided for internally mounting a data storage device in a computer system housing. The recessed bezel allows the removable data storage medium to be inserted into the data storage device to a loaded position, such that none of the removable data storage medium protrudes outwardly from the computer system housing.

17 Claims, 10 Drawing Sheets

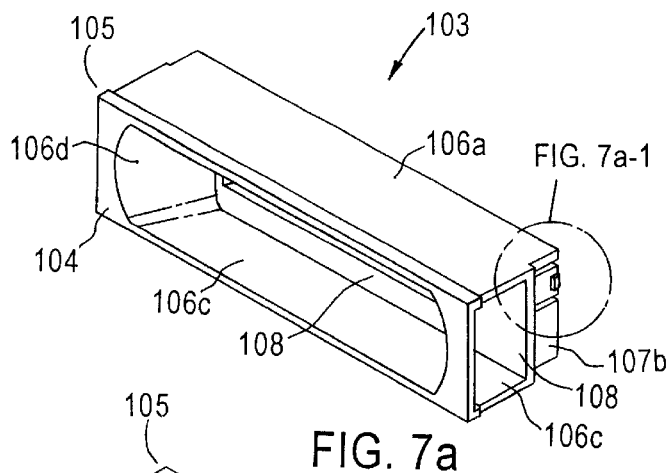
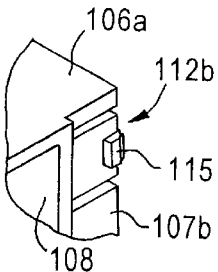
FIG. 7a
FIG. 7a-1
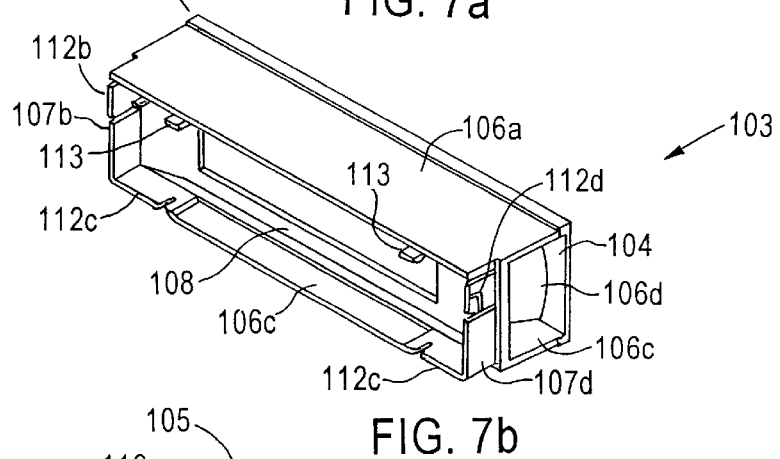
FIG. 7b
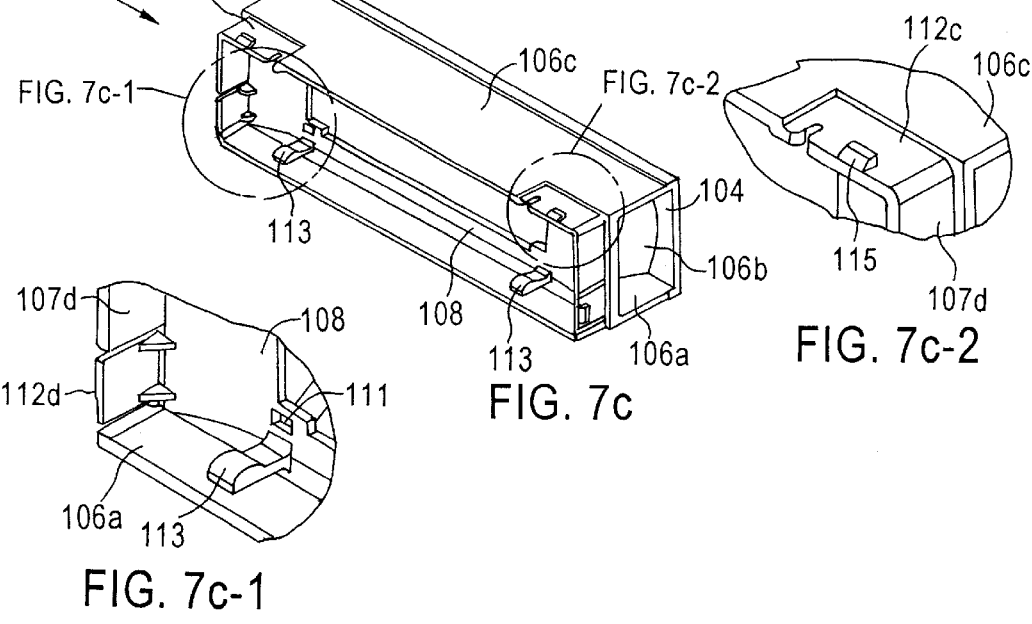
FIG. 7c
FIG. 7c-1
FIG. 7c-2

RECESSED BEZEL APPARATUS

RELATED APPLICATIONS

This application is related to and claims priority to provisional U.S. patent application Ser. No. 60/043,619, filed Apr. 14, 1997.

TECHNICAL FIELD

The present invention relates to computers, and more particularly, to an apparatus for mounting a data storage device, which is configured to receive a removable data storage medium, within a computer system unit.

BACKGROUND ART

There are a variety of data storage devices that can be used to store (and retrieve) information in the form of digital data to (and from) a removable medium. For example, tape drives are configured to receive a tape cartridge containing a magnetic recording tape on which information is stored. Similarly, an optical and/or magnetic disk drive are configured to receive a disk cartridge containing an optical and/or magnetic disk on which information is stored. Additionally, there are solid state data storage devices that are configured to receive a secondary memory cartridge or card on which information is stored, such as, for example, a removable card containing a static/flash memory circuit.

Regardless of the type of data storage device and removable data storage medium, there is a need to integrate the data storage device into a computer system. As such, the data storage device is usually configured to operate with one or more components of the computer system by way of an electrical interface, through which control and data signals are shared. The data storage device can be physically co-located with other various devices and/or circuits within a housing, such as, for example, a housing associated with a computer system unit that also contains the computer system's processing circuits, etc. In this type of configuration, the data storage device is usually referred to as being internally mounted, because the data storage device is mounted internally within the unit's housing. In other configurations, the data storage device can be physically separated from any such housing unit and coupled to the computer system as an external peripheral device. In this configuration, the data storage device is usually referred to as being externally mounted.

FIG. 1a depicts an exemplary computer system unit 10 having a housing 12 that includes a front side 14. A variety of computer system devices and circuits, which are not shown in FIG. 1a, such as, for example, a power supply, motherboard, processor circuitry, primary and secondary memory circuitry, control/data buses, and/or interface circuitry, etc., are operatively arranged within housing 12 as part of the computer system unit 10.

As depicted in FIG. 1a, a plurality of data storage devices 16 can also be internally mounted in housing 12 and operatively arranged to function as part of the computer system unit 10. Access to data storage devices 16 is provided through front side 14. By way of example, data storage devices 16 include a floppy disk drive 18, a tape drive 20, and an optical disk drive 22. Data storage devices 16, as depicted in FIG. 1a, are each arranged to receive a removable data storage medium. For example, floppy disk drive 18 is configured to receive a floppy disk (e.g., 3.5 inch magnetic floppy diskette), and optical disk drive 22 is configured to receive an optical disk (e.g., Compact Disk (CD), or Digital Versatile Disk (DVD)), on which information can be stored.

A conventional disk drive 18 or optical disk drive 22 is typically configured to accept the applicable disk within the device, so that upon full insertion of the disk into the device the disk is located entirely within the applicable device. For example, a floppy disk drive typically includes a receiving mechanism that draws the entire floppy diskette into the disk drive upon full insertion. Similarly, an optical disk drive typically includes a receiving mechanism that draws the entire CD or DVD into the disk drive upon full insertion. In certain optical disk drives, the receiving mechanism includes a drawer or carriage mechanism that transports the optical disk into (and out of) the optical disk drive.

To the contrary, in a conventional tape drive 20 the insertion and removal of a tape cartridge 24 typically requires the user to manually position tape cartridge to a loaded position within the tape drive. Thus, the user is required to grip or hold a portion of tape cartridge 24, align the tape cartridge 24 with an opening 26 in tape drive 20, and apply an adequate insertion force (e.g., 3–5 pounds) to insert the tape cartridge 24 into tape drive 20. Consequently, when the tape cartridge 24 is in the loaded position (e.g., see FIG. 1c and 1d), a portion of the tape cartridge 24 remains outside of tape drive 20. While in the loaded position, the tape cartridge 24 is held or latched by registration mechanics (not shown) within tape drive 20 which apply a holding force to the tape cartridge 24. Once tape cartridge 24 is in the loaded position, the tape drive's servoing system or drive mechanism can engage the tape moving mechanics (e.g., a roller) of tape cartridge 24 thereby allowing the tape within the tape cartridge 24 to be streamed past one or more write and/or read heads within the tape drive.

To remove the tape cartridge 24 from tape drive 20, the user once again grasps the portion of the tape cartridge 24 extending outwardly from tape drive 20 and applies an adequate removal force (e.g., 3–5 pounds) that causes the tape cartridge 24 to be released by the registration mechanics and completely removed from tape drive 20. Although the preceding example was directed towards a tape drive and tape cartridge, it is recognized that similar manual insertion and removal procedures can exist for other types of data storage devices and removable data storage mediums.

Regardless of the type of internally mounted peripheral device, having a portion of the removable data storage medium extending outwardly from housing 12 provides an obstacle that can interfere with other mechanisms associated with the computer system unit and/or present hazards to the equipment/user. What is desired is a cost effective and efficient apparatus and/or arrangement that eliminates this type of protruding obstacle.

SUMMARY OF THE INVENTION

The present invention provides a recessed bezel assembly that can be used to mount a data storage device within a housing of a computer system unit or a similar housing configuration. In accordance with one aspect of the present invention, when a data storage device is mounted using a recessed bezel assembly the removable data storage medium will not extend outwardly from the housing. As such, the recessed bezel assembly substantially eliminates the chance that a loaded removable data storage device will present a protruding obstacle that could interfere with other mechanisms associated with the computer system unit and/or present hazards to the equipment/user.

In accordance with certain aspects of the present invention, an arrangement is provided for use in a computer system housing. The arrangement includes a data storage device that is configured to store data on a removable data storage medium, and an assembly for mounting the data storage device within the computer system housing. The assembly is configured with an opening that provides access to the data storage device during the insertion and removal of the data storage medium.

In accordance with certain embodiments of the present invention, there is provided a bezel for use with a data storage device in a computer system housing. The bezel includes a front plate that has an outside surface surrounding a first opening that extends through the front plate. The front plate is configured for flush mounting to a computer system housing. The bezel also includes a back plate that has an exposed surface that surrounds a second opening that extends through the back plate. A plurality of sidewalls are connected between the front and back plates to form a slot. Preferably, the first and second openings are separated from each other by an appropriate distance such that when a removable data storage medium is inserted into the slot through the first opening and the second opening, to a fully loaded position in a data storage device, the removable data storage medium extends from the computer system housing only within the slot. In certain embodiments, the bezel further includes at least one mounting mechanism for use in securing the bezel to the data storage device and to the computer system housing.

The above stated needs are also meet by an arrangement, in accordance with certain embodiments of the present invention, that includes a housing, a data storage device that is configured to store data on a removable data storage medium, and a bezel connected to the data storage device and the housing. In certain embodiments, the arrangement further includes at least one mounting mechanism that is connected to the bezel, the data storage device and the housing. By way of example, in certain embodiments the mounting mechanism includes at least one rail that is configured to be attached to the bezel, the data storage device and the housing. In still further embodiments, the arrangement also includes a door that is moveably connected to the housing and configured to cover at least a portion of the outside surface of the front plate when the door is in a closed position.

BRIEF DESCRIPTION OF THE DRAWINGS

The present invention is illustrated by way of example, and not by way of limitation, in the figures of the accompanying drawings and in which like reference numerals refer to similar elements in which;

FIG. 7a depicts a front perspective view and a close-up view of an upright recessed bezel as in FIG. 6, in accordance with certain embodiments of the present invention;

FIG. 7b depicts a rear perspective view of the upright recessed bezel in FIG. 7a, in accordance with certain embodiments of the present invention;

FIG. 7c depicts a rear perspective view and close-ups views of an upside down recessed bezel as in FIGS. 7a–b, in accordance with certain embodiments of the present invention;

DETAILED DESCRIPTION OF EXEMPLARY EMBODIMENTS

Figure 2:
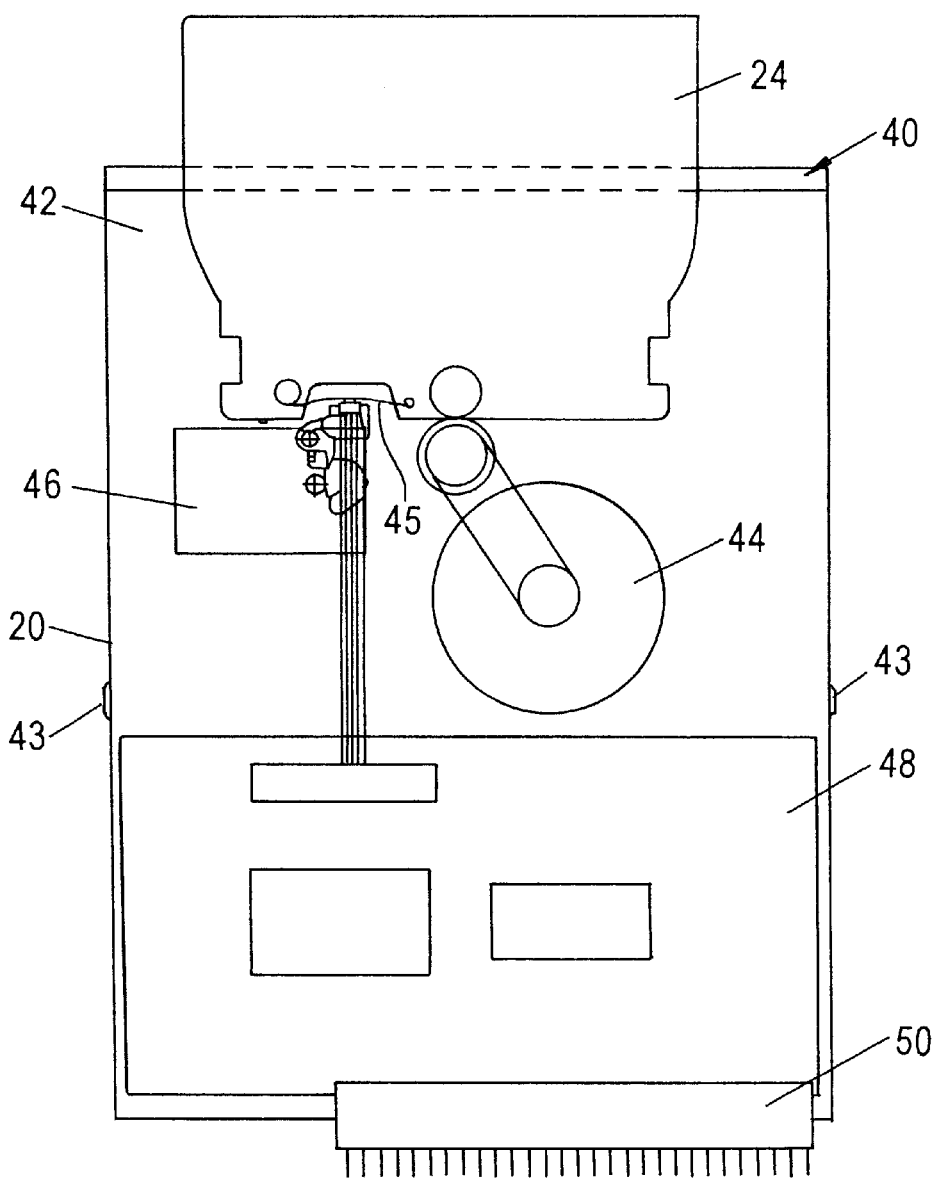
FIG. 2 depicts a conventional tape drive data storage device, as in FIGS. 1a–d, having a tape cartridge inserted therein to a loaded position.

FIG. 2 depicts a top view of an exemplary tape drive 20 having a tape cartridge 24 inserted and held in a loaded position. As shown, tape drive 20 includes a bezel assembly 40 that is mounted to main chassis 42. Bezel assembly 40 is a conventional bezel that is substantially planar and provides an opening through which tape cartridge 24 can be inserted into tape drive 20. In certain conventional embodiments, bezel assembly 40 includes a self-closing door (not shown) that is pushed open by the force of the tape cartridge 24 during insertion, and biased to close when the tape cartridge 24 is removed- The self-closing door is designed to reduce the amount of contaminants that enter tape drive 20.

Figure 1A:
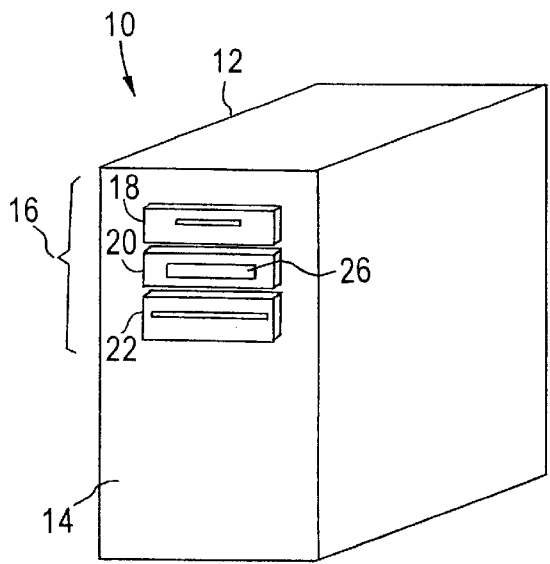
FIGS. 1a–d depict different views of a conventional computer system unit having a plurality of internally mounted data storage devices, including a tape drive data storage device.
Figure 1B:
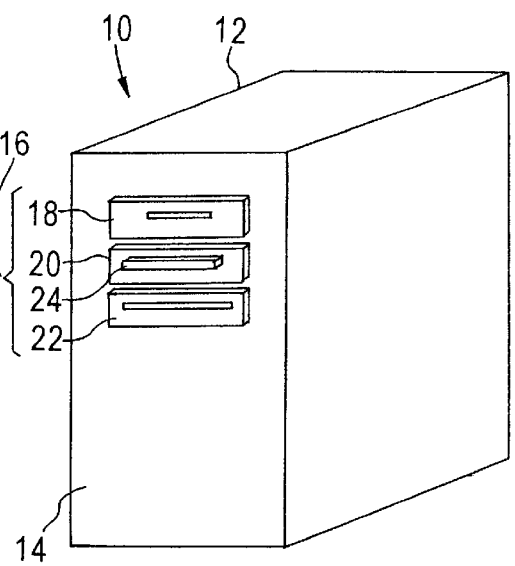
Figure 1C:
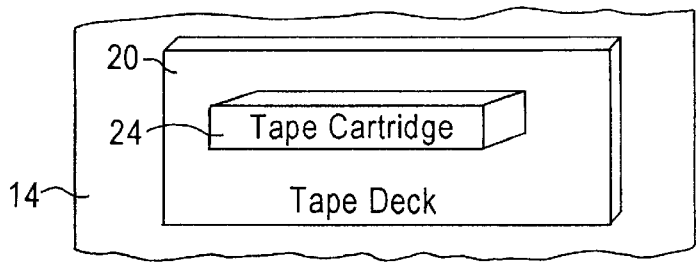
Figure 1D:
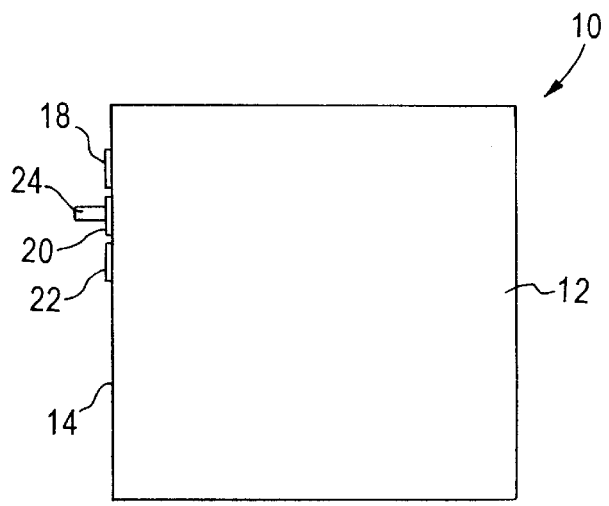

Main chassis 42 provides a rigid support on which the internal components of tape drive 20 are supported. Main chassis 42 is further configured to be attached to a housing 12, such as that shown in FIG. 1*a*. By way of example, the main chassis 42 depicted in FIG. 2 includes threaded openings 43 that can be used to connect the main chassis 42 to mounting brackets within housing 12 using screws or bolts.

Tape drive 20 includes a tape drive mechanism 44 that is mounted within main chassis 42 and configured to engage tape cartridge 24 and rotatably advance the tape 45 within tape cartridge 24 during read and write operations. A head positioning assembly 46 brings the read and or write head(s) into contact with tape 45 during read and write operations. Tape drive 20 further includes a control assembly 48 that is used to control the read and write operations and the advancement of tape 45, and to provide for the inputting and outputting of power, control and or data signals through an interface connector 50. Once mounted within housing 12, tape drive 20 is then coupled to other computer system circuits and devices by way of a multiple conductor cable/bus (not shown) between interface connector 50 and the other applicable computer system circuits and devices.

Figure 3B:
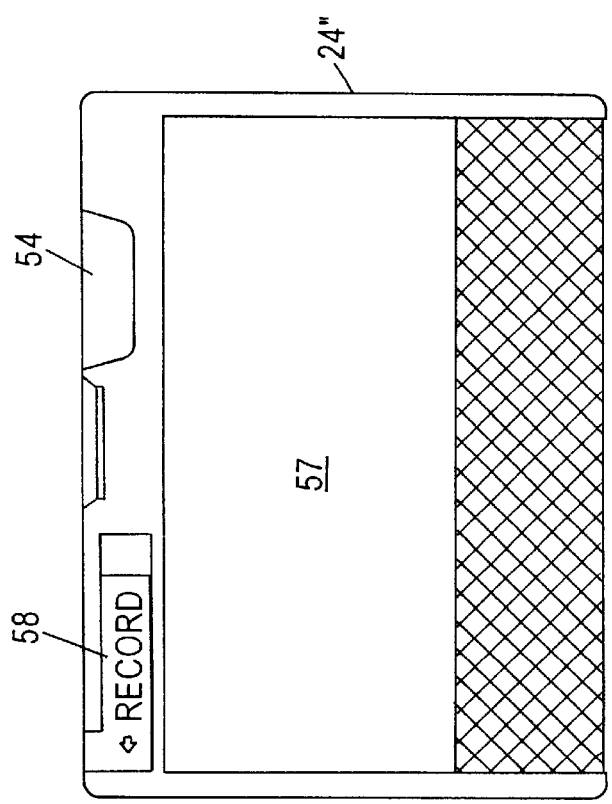
FIG. 3b depicts a top view of another type of exemplary tape cartridge for use with a tape drive data storage device, as in FIG. 2.
Figure 3C:
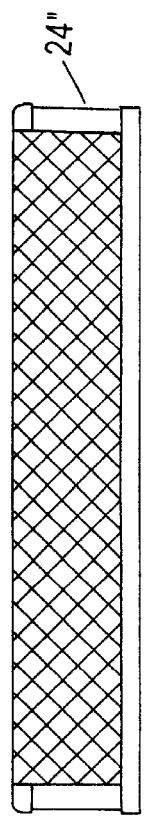
FIG. 3c depicts a front view of the tape cartridge of FIG. 3b.
Figure 3A:
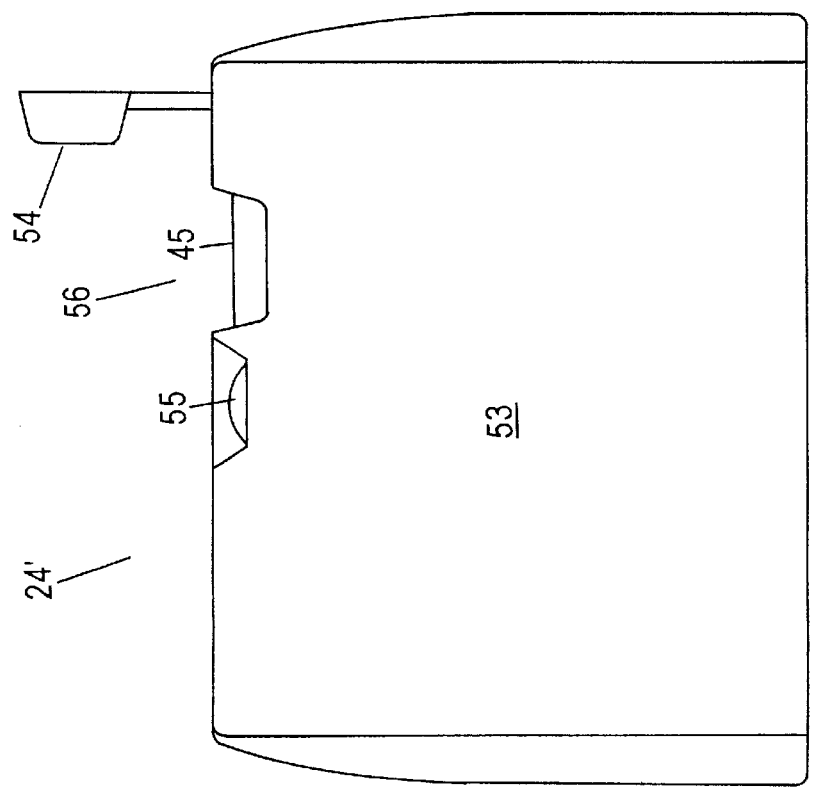
FIG. 3a depicts a top view of an exemplary tape cartridge for use with a tape drive data storage device, as in FIG. 2.

FIGS. 3*a–c* depict further examples of tape cartridges that can be used with tape drive 20. FIG. 3*a* depicts a top view of a tape cartridge 24' having a tape access door 54 that is depicted as being open, but which is normally biased to be closed. Tape access door 54 is pivotally mounted to a body 53 of tape cartridge 24' and when closed protectively covers tape 45 within a tape access opening 56. When open (as depicted), tape access door 54 allows access to an exposed portion of tape 45 within opening 56. Tape cartridge 24' includes a roller 55 that is configured to transport tape 45 within tape cartridge 24' when rotated. FIGS. 3*b* (top view) and 3*c* (side view) depict a similar tape cartridge 24", having a slightly different shaped body 57 and a closed tape access door 54. Tape cartridge 24" includes a locking mechanism 58 that is configured to indicate if tape cartridge 24" can be used for recording data (i.e., a write operation). It is recognized that other similar types of tape cartridges can be used with tape drive 20, without departing from the scope of the present invention.

Figure 4:
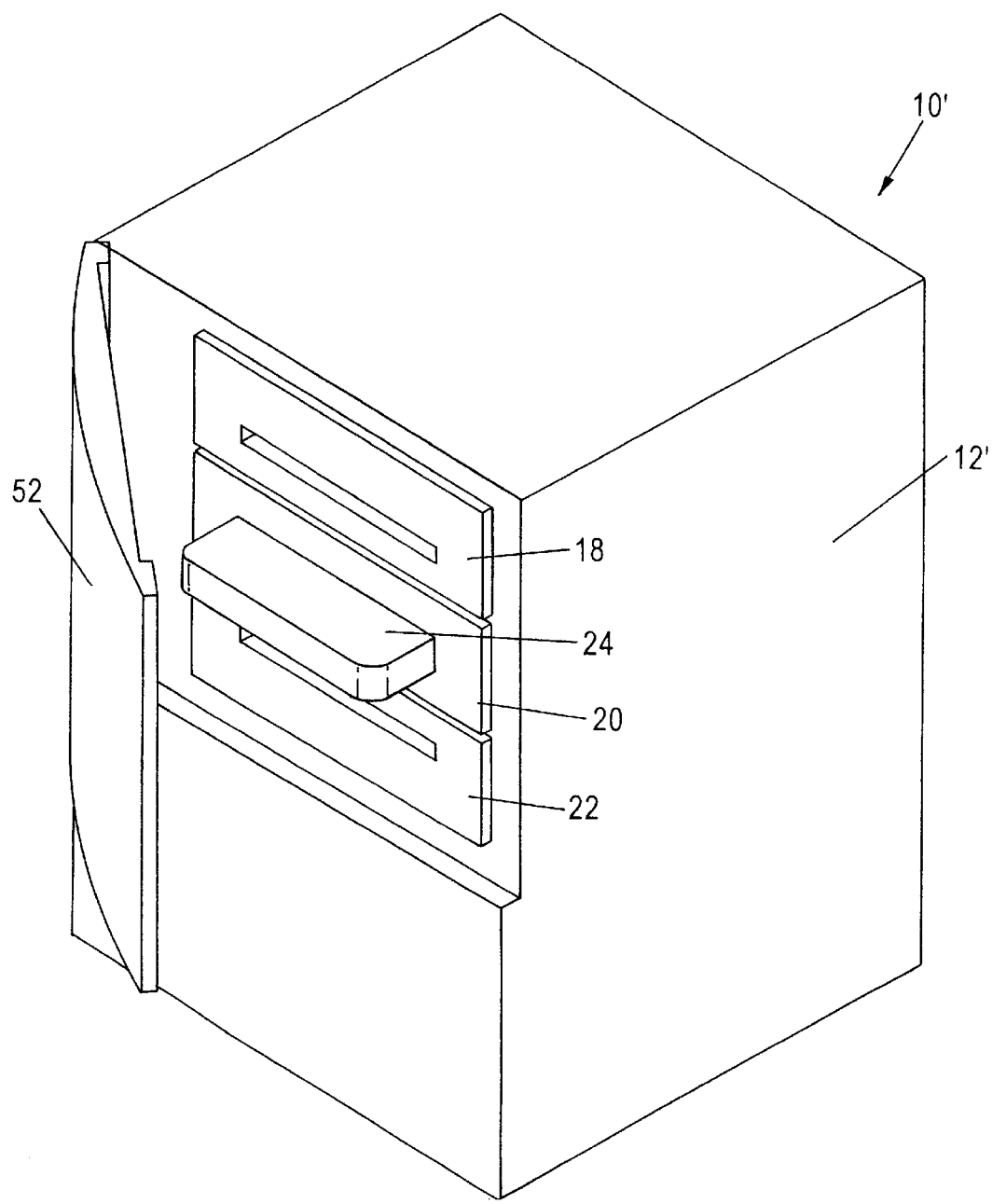
FIG. 4 depicts a conventional computer system unit as in FIGS. 1a–d, having a plurality of internally mounted data storage devices, including a tape drive that is mounted within a housing using a conventional bezel arrangement that causes a portion of the tape cartridge to protrude outwardly from the housing and thereby interfere with the closing of the server door.

FIG. 4 depicts a computer system unit 10' that can be used as a server in a computer network configuration. Computer system unit 10' is similar to unit 10 in FIGS. 1*a–d*, but has a server body 12' that includes a server door 52 that is pivotally arranged to cover the exposed (i.e., user accessible) portions of at least one of the plurality of data storage devices 16 when closed. Server door 52 is typically used to control access to the various internally mounted data storage devices. As depicted, unit 10' further includes a conventional tape drive 20 having a tape cartridge 24 inserted to the loaded position therein. As shown, a portion of the tape cartridge 24 remains outside of tape drive 20 when inserted to the loaded position. Because this portion of tape cartridge 24 extends or protrudes outwardly from the tape drive 20 and housing 12' it interferes with the closing of server door 52. Thus, as depicted server door 52 cannot be properly closed when the tape cartridge 24 is in the loaded position.

The distance that the tape cartridge 24 protrudes beyond the front of tape drive 20 and/or housing 12' depends on the size and type of the tape cartridge 24. For example, a standard DC 2000 tape cartridge may, in accordance with its associated ANSI specification, protrude by approximately ¾ of an inch. Certain other tape cartridges 24, such as, for example, a Travan™ tape cartridge available from Imation Corporation may protrude by approximately an inch beyond the front of tape drive 20.

Figure 5:
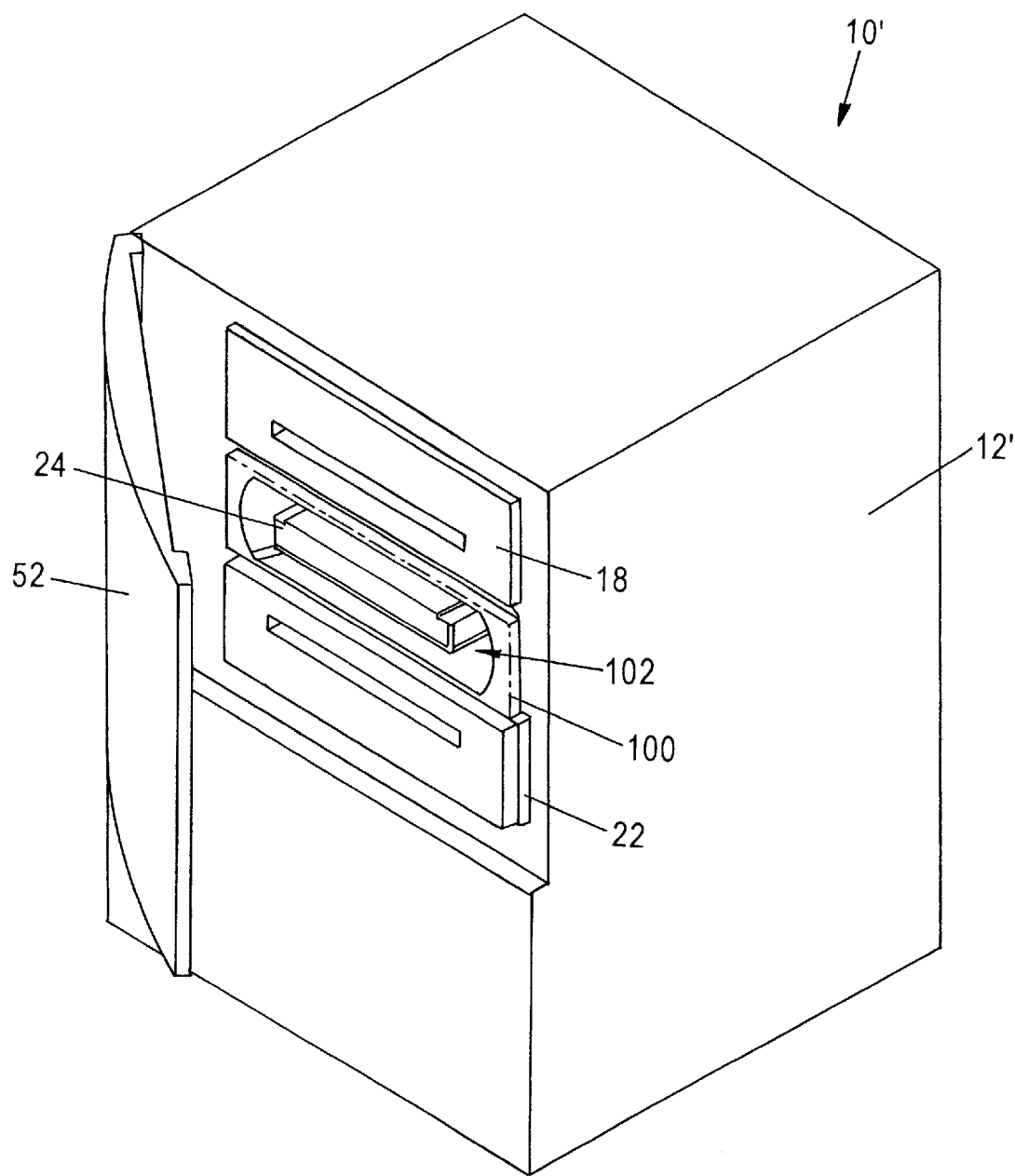
FIG. 5 depicts a computer system unit having a plurality of internally mounted data storage devices, including a tape drive that is mounted within the housing using a recessed bezel assembly that allows the tape cartridge to be loaded into the tape drive without protruding beyond the housing and without interfering with the closing of the server door, in accordance with certain embodiments of the present invention.

With this in mind, FIG. 5 depicts a similar computer system unit 10' having a recessed bezel assembly 100 that mounts the tape drive 20 within housing 12', in accordance with certain embodiments of the present invention. As shown, recessed bezel assembly 100 eliminates the need to have a portion of tape cartridge 24 protruding outwardly from tape drive 20 and/or housing 12'. Recessed bezel assembly 100 is configured to allow mounting of a conventional tape drive 20 within housing 12' (or 12 as in FIGS. 1*a–d*) in a recessed manner. However, the portion of the tape cartridge 24 that extends outwardly from tape drive 20 remains within a large access or gripping space 102 that is defined, at least partially, by the recessed bezel assembly 100. As such, server door 52 can be properly closed, even when tape cartridge 24 is in the loaded position.

Figure 6:
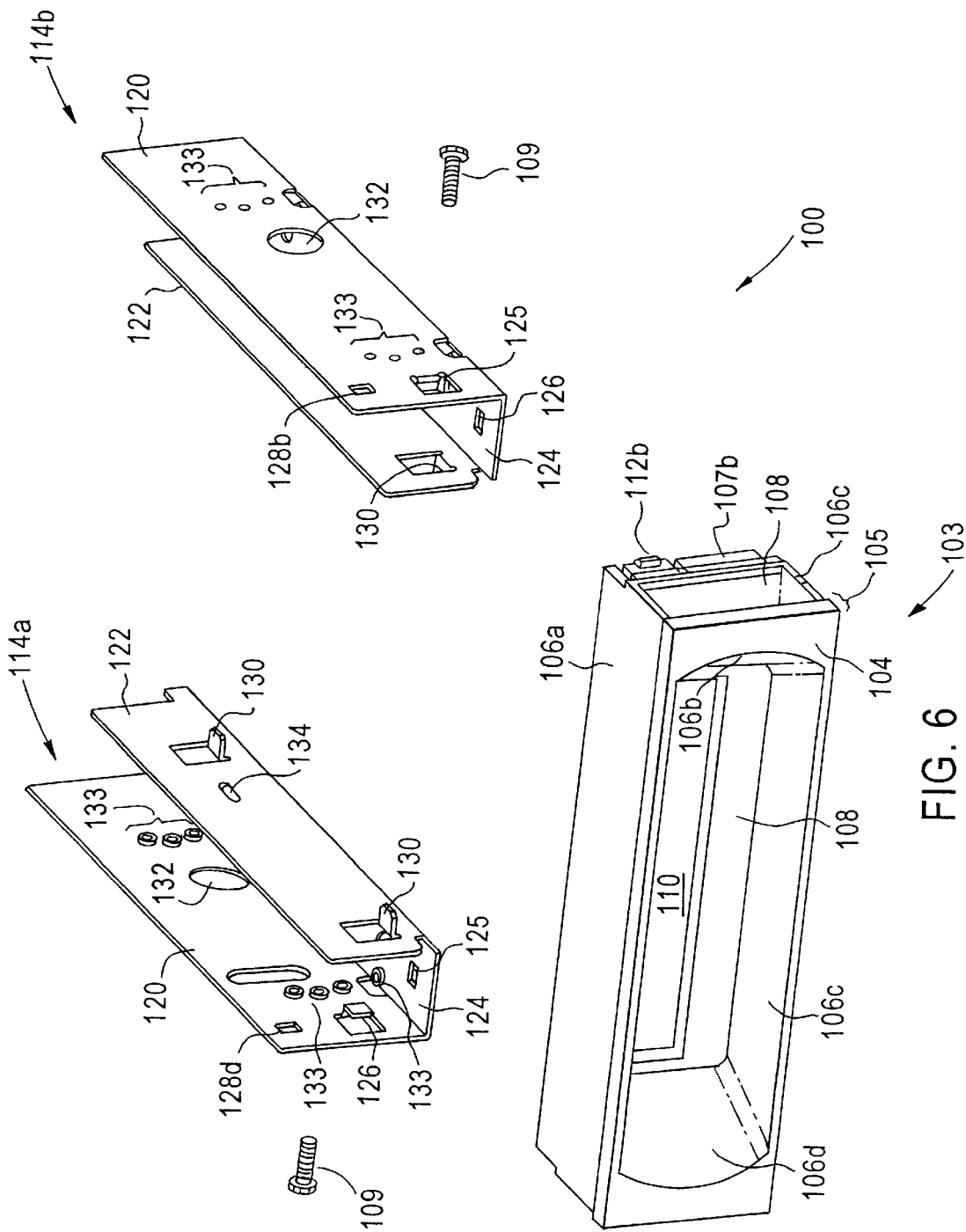
FIG. 6 is an exploded view of a recessed bezel assembly, in accordance with certain embodiments of the present invention, which is configured to hold a conventional tape drive data storage device as in FIG. 2 within a housing.

FIG. 6 depicts an exploded view of an exemplary recessed bezel assembly 100, in accordance with certain embodiments of the present invention. As shown, recessed bezel assembly 100 includes a recessed bezel 103, adapter rails 114*a–b*, and a plurality of bolts 109. Recessed bezel 103 is configured to attach to adapter rails 114*a–b*, which are each configured to attach to the main chassis 42 of tape drive 20. For example, adapter rails 114*a–b* can be attached to opposite sides of main chassis 42 by inserting a bolt 109 through an access opening 132 and a mounting hole 134 in each of the adapter rails 114*a–b* and screwing the bolt into threaded openings 43 (see FIG. 2) of tape drive 20. Further, bolts 109, or similar securing hardware, can be used to secure adapter rails 114*a–b* to housing 12. For example, a plurality of threaded holes 133 are provided at locations about adapter rails 114*a–b* for such use, in accordance with the applicable computer peripheral installation specification. In this exemplary embodiment, recessed bezel 103 is attached to each of the adapter rails 114*a–b* by a plurality of snap connectors 112*b*, 112*c* and 112*d* (best seen in FIGS. 7*b–c*), which are configured to flexibly engage snap connector openings 128*b*, 125 and 128*d*, respectively, provided in adapter rails 114*a–b*.

Recessed bezel 103 is preferably formed or molded of plastic or similar material. As shown in FIGS. 6, recessed bezel 103 includes a front faceplate 104 that forms a flange 105. Front faceplate 104 is substantially planar and forms an opening to gripping space 102 (see FIG. 5). Gripping space 102 is preferably designed to provide adequate room for a user's fingers to grab and hold a portion of tape cartridge 24 during insertion and removal thereof. Flange 105 is configured to slightly overlap the external edges of a peripheral opening or mounting bay of a housing 12 (or 12'), thereby providing proper alignment of the recessed bezel assembly 100 and tape drive 20 within housing 12 (or 12'), and/or a more aesthetic appearance. A plurality of sidewalls 106*a–d* are connected to front faceplate 104 to define gripping space 102. Sidewalls 106*a–d* need not be planar. A back plate 108 is connected to each of the sidewalls 106*a–d*. Back plate 108 is substantially planar in shape and forms an orifice 110 through which tape cartridge 24 is inserted into tape drive 20. Snap connectors 112*b*, 112*c* and 112*d*, and extended sidewalls 107*b* and 107*d* are also perpendicularly attached to back plate 108 and configured to receive tape drive 20 and to attach recessed bezel 103 to adapter rails 114*a–b*, as applicable. These and other features associated with the exemplary recessed bezel 103 are discussed in detail below with reference to FIGS. 7*a–c* and 8*a–i*.

Adapter rails 114*a–b* are preferably mirror copies of one another and formed of a substantially rigid material, such as, for example, a metal. As viewed from the front side of tape drive 20, adapter rail 114*a* is configured to be mounted on the left-hand side and adapter rail 114*b* is configured to be mounted on the right-hand side of tape drive 20. In this exemplary embodiment, adapter rails 114*a–b* have a "U" shape that results in three sides being formed, namely a housing side 120, a tape drive side 122, and a bottom side 124. Housing side 120 includes an access opening 132, which allows access to a mounting hole 134 of tape drive side 122. Housing side 120 of adapter rail 114*b* includes an alignment arm 126 that is configured to receive extended sidewall 107*b* and a snap connector opening 128*b* that is configured to receive snap connector 112*b*. Similarly, housing side 120 of adapter rail 114*a* includes an alignment arm 126 that is configured to receive extended sidewall 107*d* and a snap connector opening 128*d* that is configured to receive snap connector 112*d* (see, e.g., FIGS. 7*b–c*). A plurality of threaded holes 133 are arranged about housing side 120 of adapter rails 114*a–b*, which allow the adapter rails 114*a–b* to be secured to housing 12 (or 12').

In addition to forming a mounting hole 134, tape drive side 122 also includes a plurality of support arms 130 that extend perpendicular to tape drive side 122 and are each configured to contact and support main chassis 42 of tape drive 20. Bottom side 124 includes a snap connector opening 125 that is configured to receive a snap connector 112*c* of recessed bezel 103 (see, e.g., FIG. 7*c*). Bottom side 124 further includes at least one threaded hole 133 that can be used to secure the adapter rail 114*a* or 114*b* to a housing 12 (or 12'), as needed.

In the exemplary embodiment of FIG. 6, the recessed bezel assembly 100 is designed for use with a tape drive 20 having a height of approximately 1 inch. However, those skilled in the art will recognize that this exemplary 100 recessed bezel assembly can be resized and/or adapted for use with a variety of data storage devices and/or computer system units, including conventional personal and desktop computers having housings with either vertical or horizontal profiles.

The exemplary recessed bezel assembly 100 of FIG. 6 is designed to fit into a half-height peripheral mounting bay of the housing 12 (or 12'). The term half-height refers to one half of the original standard peripheral height of 3¼ inches. Thus, the term half-height means that the height of the peripheral device is one half of 3¼ inches, or 1⅝ inches. As such, front face plate 104 of recessed bezel 103 has a height of about 1⅝ inches, and the adapter rails 114*a–b* are sized to provide the appropriate features to mount a standard one inch peripheral device, such as, for example, tape drive 20, into a half height peripheral bay.

FIGS. 7*a–c* depict different views of recessed bezel 103. FIG. 7*a*, which is similar to FIG. 6, further depicts snap connector 112*b*. As shown, snap connector 112*b* extends perpendicular to back plate 108 and includes a bump 115. During assembly, snap connector 112*b* is arranged to bend slightly when first contacted by housing side 120 of adapter rail 114*b*, and to force bump 115 into snap connector opening 128*b* when properly seated. The other snap connectors 112*c* (see, e.g., FIG. 7*c*) and 112*d* are each configured to work in this manner when properly seated with their corresponding snap connector openings 125 and 128*d*, respectively. This connection can be disconnected by applying a releasing force to bump 115, which causes the snap connector to bend slightly, and reversing the coupling process.

FIG. 7*b* depicts a backside-view of recessed bezel 103, showing snap connector 112*d* and tabs 113. Snap connector 112*d* is similar to snap connector 112*b* and is configured to attach recessed bezel 103 to adapter rail 114*a*. Tabs 113 extend perpendicularly from back face 108 and are configured to align the top of tape drive 20 with recessed bezel 103.

FIG. 7*c* depicts a bottom/backside view of recessed bezel 103, showing snap connectors 112*c*, tabs 113 in more detail, and an indicator hole 11. Snap connectors 112*c* are similar to snap connectors 112*b* and 112*d*. Tabs 113 are shown as extending from back face 108. An indicator hole 111, which is optional, extends through back plate 108 and is configured to allow an indicator lamp (not shown) located on the front of a tape drive 20 to be viewed when the recessed bezel 103 is used in conjunction with the tape drive 20.

Figure 8A:
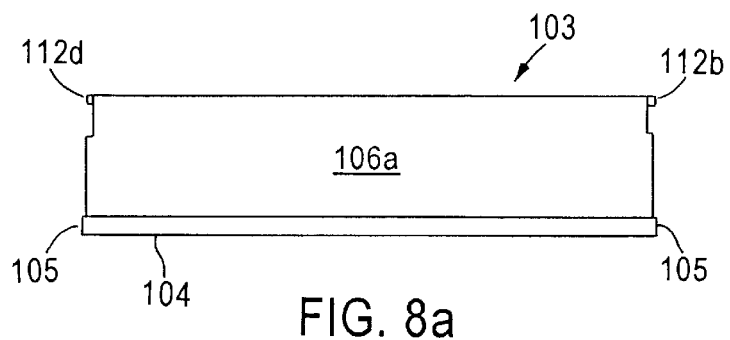
FIG. 8a depicts a top view of a recessed bezel as in FIGS. 7a–c, in accordance with certain embodiments of the present invention.
Figure 8B:
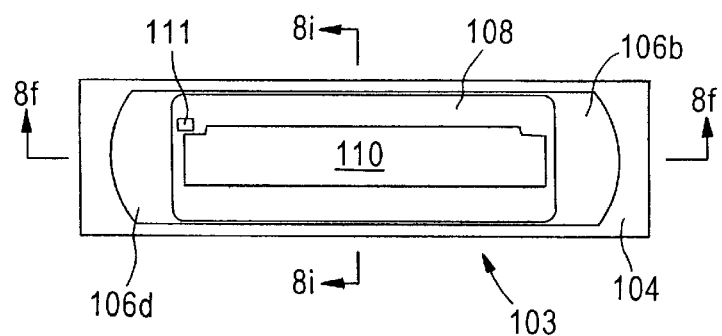
FIG. 8b depicts a front view of the recessed bezel in FIG. 8a, in accordance with certain embodiments of the present invention.
Figure 8C:
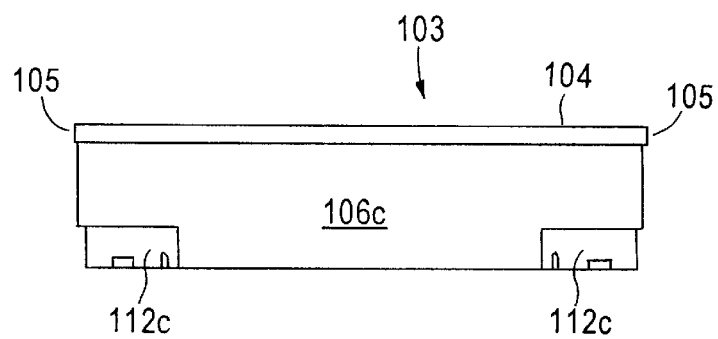
FIG. 8c depicts a bottom view of the recessed bezel in FIGS. 8a–b, in accordance with certain embodiments of the present invention.
Figure 8D:
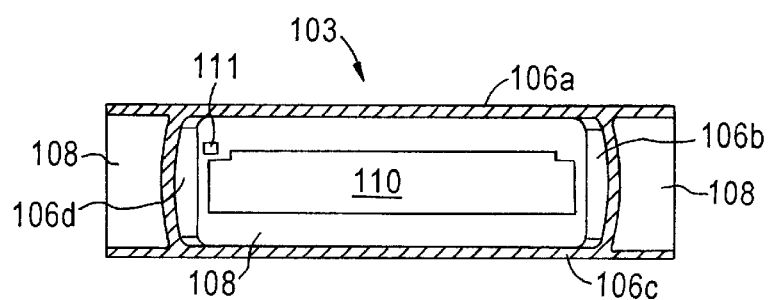
FIG. 8d depicts a cross-section view of the recessed bezel in FIGS. 8a–c at section A—A depicted in FIG. 8h, in accordance with certain embodiments of the present invention.
Figure 8E:
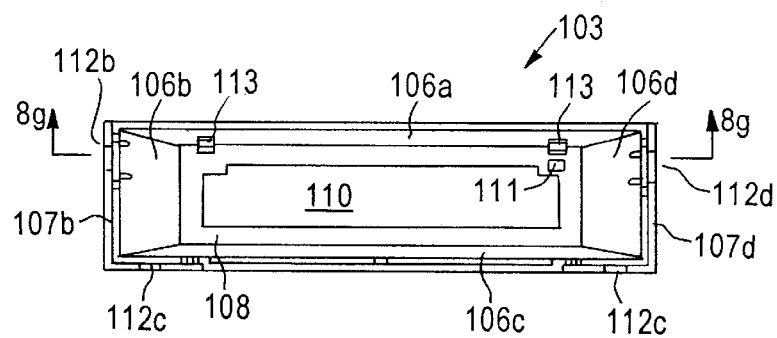
FIG. 8e depicts a rear view of the recessed bezel in FIGS. 8a–d, in accordance with certain embodiments of the present invention.
Figure 8F:
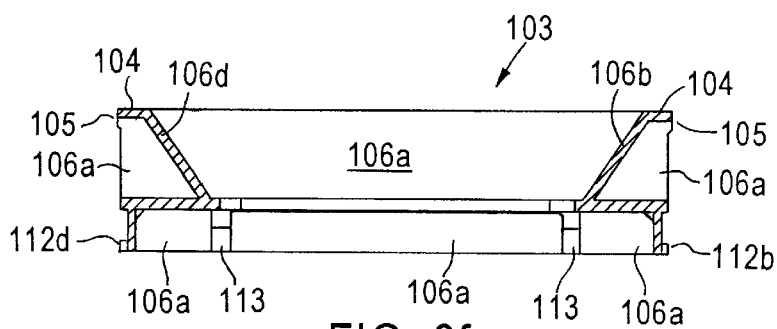
FIG. 8f depicts a cross-section view of the recessed bezel in FIGS. 8a–e at section B—B depicted in FIG. 8b, in accordance with certain embodiments of the present invention.
Figure 8G:
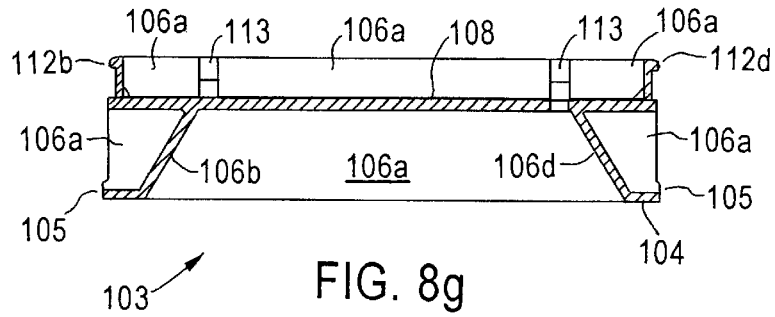
FIG. 8g depicts a cross-section view of the recessed bezel in FIGS. 8a–f at section D—D depicted in FIG. 8e, in accordance with certain embodiments of the present invention.
Figure 8I:
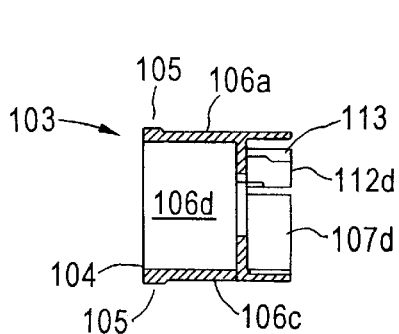
FIG. 8i depicts a cross-section view of the recessed bezel in FIGS. 8a–h at section C—C depicted in FIG. 8b, in accordance with certain embodiments of the present invention.
Figure 8H:
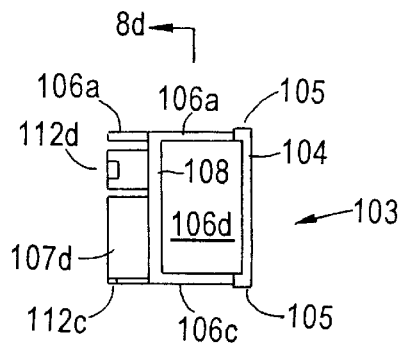
FIG. 8h depicts a side view of the recessed bezel in FIG. 8a–g, in accordance with certain embodiments of the present invention.

Additional features are shown in FIGS. 8*a–i*, which depict various two-dimensional views and cross-sectional views of recessed bezel 103. In particular, FIG. 8*a* depicts a top-view, FIG. 8*b* depicts a front-view, FIG. 8*c* depicts a bottom view, FIG. 8*e* depicts a back-view, and FIG. 8*h* depicts an exemplary side-view. FIG. 8*d* depicts a cross-sectional view of recessed bezel 103 from perspective A—A as shown in FIG. 8*h*. FIG. 8*f* depicts a cross-sectional view of recessed bezel 103 from perspective B—B as shown in FIG. 8*b*. FIG. 8*i* depicts a cross-sectional view of recessed bezel 103 from perspective C—C as shown in FIG. 8*b*. FIG. 8*g* depicts a cross-sectional view of recessed bezel 103 from perspective D—D as shown in FIG. 8*e*.

Figure 9:
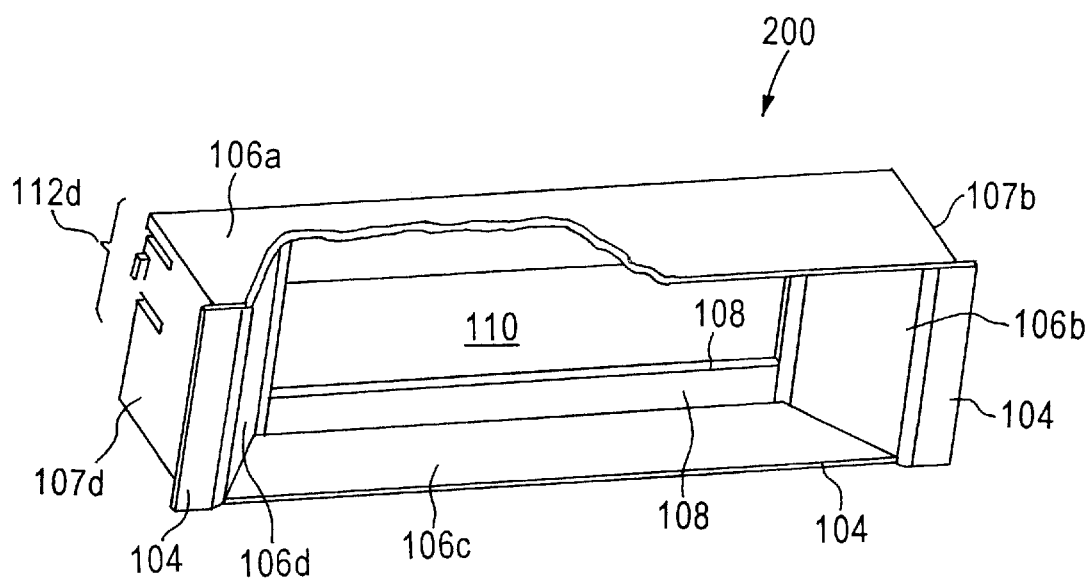
FIG. 9 depicts a perspective view of an exemplary recessed bezel, in accordance with certain other embodiments of the present invention.

FIG. 9 depicts an exemplary recessed bezel 200, in accordance with another embodiment of the present invention. Recessed bezel 200 has many of the same features as recessed bezel 103 and is configured to attach to adapter rails 114*a* and 114*b* in a similar manner. Differences between recessed bezels 200 and 103 exist in the shape and configuration of the front faceplate 104, sidewalls 106*a–d* and back plate 108. For example, as depicted in FIG. 9, the sloping sidewalls 106*b* and 106*d* of recessed bezel 200 are more planar in shape when compared to the sloping sidewalls 106*b* and 106*d* of recessed bezel 103, which are partially curved. Sidewall 106*a* is depicted as being cut-away to better illustrate the back plate 108 and orifice 110.

Although the present invention has been described and illustrated in detail, it is to be clearly understood that the same is by way of illustration and example only and is not to be taken by way of limitation, the spirit and scope of the present invention being limited only by the terms of the appended claims.

What is claimed is:

1. A bezel for use with a data storage device mounted in a computer system housing, the bezel comprising:
   a front plate having an outside surface that surrounds a first opening that extends through the front plate and configured for flush mounting to a computer system housing;
   a back plate having an exposed surface that surrounds a second opening that extends through the back plate; and
   a plurality of sidewalls connected between the front and back plates and forming a slot,
   wherein the first opening, and the second opening are separated from each other by a distance such that a removable data storage medium inserted into the slot through the first opening and the second opening into a fully loaded position in a data storage device extends from the computer system housing only within the slot;

wherein the first opening is larger than the second opening; and wherein at least one of the plurality of sidewalls is non-perpendicular with respect to the back plate.

2. The bezel as recited in claim 1, wherein at least one of the plurality of sidewalls is non-perpendicular with respect to the front plate.

3. The bezel as recited in claim 1, wherein the outside surface of the front plate is substantially planar.

4. The bezel as recited in claim 1, wherein at least one of the plurality of sidewalls has a substantially non-planar shape.

5. The bezel as recited in claim 1, further comprising at least one mounting mechanism that is connected to at least one of the back plate or at least one of the plurality of sidewalls and adapted to secure the bezel to a data storage device.

6. The bezel as recited in claim 1, wherein the bezel is a unitary piece formed of plastic.

7. The bezel as recited in claim 1, wherein the data storage device is a tape drive and the data storage medium is a tape cartridge.

8. The bezel as recited in claim 5, wherein the mounting mechanism is further adapted for securement to a computer system housing.

9. An arrangement comprising:

a housing;

a data storage device configured to store data on a removable data storage medium; and a bezel connected to the data storage device and the housing, the bezel comprising:

a front plate having an outside surface that surrounds a first opening that extends through the front plate;

a back plate having an exposed surface that surrounds a second opening that extends through the back plate; and a plurality of sidewalls connected between the front and back plates and forming a slot, wherein the first opening, and the second opening are separated from each other by a distance such that a removable data storage medium inserted into the slot through the first opening and the second opening into a fully loaded position in a data storage device extends from the computer system housing only within the slot;

wherein the first opening is larger than the second opening; and wherein at least one of the plurality of sidewalls is non-perpendicular with respect to the back plate.

10. The arrangement as recited in claim 9, wherein the outside surface of the front plate is substantially planar.

11. The arrangement as recited in claim 9, wherein at least one of the plurality of sidewalls has a substantially non-planar shape.

12. The arrangement as recited in claim 9, further comprising at least one mounting mechanism that is connected to the bezel, the data storage device and the housing.

13. The arrangement as recited in claim 9, further comprising a door that is moveably connected to the housing and configured to cover at least a portion of the outside surface of the front plate when the door is closed.

14. The arrangement as recited in claim 9, wherein the data storage device is a tape drive and the data storage medium is a tape cartridge.

15. The arrangement as recited in claim 12, wherein the mounting mechanism includes a rail that is configured to be attached to the bezel, the data storage device and the housing.

16. A bezel for use with a data storage device mounted in a computer system housing, the bezel comprising:

a front plate having an outside surface that surrounds a first opening that extends through the front plate and configured for flush mounting to a computer system housing;

a back plate having an exposed surface that surrounds a second opening that extends through the back plate; and a plurality of sidewalls connected between the front and back plates and forming a slot, wherein the first opening, and the second opening are separated from each other by a distance such that a removable data storage medium inserted into the slot through the first opening and the second opening into a fully loaded position in a data storage device extends from the computer system housing only within the slot;

wherein the first opening is larger than the second opening; and wherein at least one of the plurality of sidewalls has a substantially non-planar shape.

17. An arrangement comprising:

a housing;

a data storage device configured to store data on a removable data storage medium; and a bezel connected to the data storage device and the housing, the bezel comprising:

a front plate having an outside surface that surrounds a first opening that extends through the front plate;

a back plate having an exposed surface that surrounds a second opening that extends through the back plate; and a plurality of sidewalls connected between the front and back plates and forming a slot, wherein the first opening, and the second opening are separated from each other by a distance such that a removable data storage medium inserted into the slot through the first opening and the second opening into a fully loaded position in a data storage device extends from the computer system housing only within the slot;

wherein the first opening is larger than the second opening; and wherein at least one of the plurality of sidewalls has a substantially non-planar shape.

* * * * *